Patented Sept. 30, 1947

2,428,239

UNITED STATES PATENT OFFICE 2,428,239

ALKAMINE DERIVATIVES OF META AMINO-METHYL BENZOIC ACID

Robert P. Parker, Somerville, N. J., and Arthur J. Hill, New Haven, Conn., assignors to American Cyanamid Company, New York, N. Y., a corporation of Maine No Drawing. Application January 18, 1946, Serial No. 642,099

5 Claims. (Cl. 260—472)

1

This invention relates to alkamine esters of substituted meta aminomethyl benzoic acids.

According to the present invention it has been found that a series of alkamine esters of substituted meta aminomethyl benzoic acids can be prepared, some of which compounds are local anesthetics. The compounds of the present invention may be represented by the following formula:

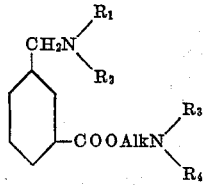

in which Alk is alkylene, $R_1$ and $R_2$ and $R_3$ and $R_4$ are members of the group consisting of lower aliphatic hydrocarbon radicals and a portion of a saturated heterocyclic ring.

The products form salts such as hydrochlorides, sulfates, borates, and the like with acids or they are capable of forming quaternary salts with alkyl halides such as the methiodide, ethobromide and the like.

While the products of the present invention are not limited to any particular process of making, we prefer to prepare them from the corresponding meta aminomethylbenzoyl halide by reaction with the desired amino alcohol. The meta aminomethylbenzoyl halide can be prepared from the corresponding acids by thionyl halides. Some meta aminomethyl benzoic acids are known in the literature such as the diethylaminomethyl compound and all of them can be prepared simply by reaction of the corresponding amines with meta cyanbenzylbromide followed by hydrolysis of the cyanide group in the usual manner with acid such as hydrochloric acid. The amino alcohols which can be used in the esterification reactions of the present invention are numerous. Not only can the simple alcohols be used such as β-diethylaminoethanol, β-diethylaminoproponal, γ-di-ethylaminopropanol, and γ-dibutylaminopropanol but other less common amino alcohols can be employed such as dibutylaminobutanols, β,β-phenylethylaminoethanol, β-dipropylaminoethanol, β-morpholinoethanol, β-piperidinoethanol, β-dicyclohexylaminoethanol, β-methylcyclohexylaminoethanol, β-phenylaminoethanol, β,β-dimethyl-γ-piperidinopropanol and the like.

The invention will be described in greater detail in conjunction with the following specific examples which are typical illustrations. The parts are by weight.

Example 1

β-Diethylaminoethyl-m-diethylaminomethyl benzoate

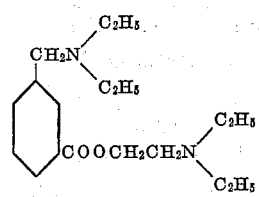

25 parts of the sodium salt of m-diethylaminomethyl benzoic acid are treated slowly in the cold with 25 parts of thionyl chloride, the reaction mixture being stirred for 1 hour at cold temperature on completion of the thionyl chloride addition, and then the temperature is raised to 20° for 1 hour and then to 55° for 3 hours. The excess thionyl chloride is removed by vacuum distillation and the residue is triturated with dry ether. After removal of the ether by distillation, 28 parts of cold pyridine is run in while the reaction mixture is maintained at a temperature of 5° C. At this point, with good stirring, 25 parts of diethylaminoethanol are added slowly and stirring is continued for ½ hour. The temperature is raised slowly to reflux, at which temperature stirring is continued for 1½ hours. After cooling the reaction mixture to 10° C., water and soda ash are added to liberate the free bases. The β-diethylaminoethyl (m-diethylaminomethyl) benzoate is purified by distillation under reduced pressure (boiling point 168.5°–169.5° C.). The dihydrochloride salt is prepared through treatment of a dry ether solution of the base with dry hydrogen chloride. When pure, it melts at 180–184° C.

The sodium salt of dimethylaminomethyl benzoic acid used in the above preparation is obtained in the following manner:

175 parts of m-cyanbenzyl bromide suspended in 460 parts of ether are treated with 131 parts of diethylamine dissolved in 50 parts of ether, and after heating for 6 hours, and filtering from diethylamine hydrobromide, the resulting m-diethylaminomethyl benzonitrile is purified by distillation under reduced pressure. The hydrochloride salt, when purified melts at 164–166° C. 142 parts of this nitrile are treated with 2900 parts of hydrochloric acid (1.19) and when hydrolysis is complete, the hydrochloric acid is removed by distillation. The residue is dried over silica gel and the resulting hydrochloride of m- diethylaminomethyl benzoic acid, when pure, melts at 142°–145° C. The sodium salt of this acid is prepared by dissolving the hydrochloride in water, carefully neutralizing with correct quantity of caustic, and evaporating the resulting solution to dryness.

Example 2

β-Di-n-butylaminoethyl-m-diethylaminomethyl benzoate

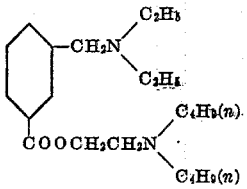

When in the procedure of Example 1, 37.0 parts of β'-di-n-butylamino-ethanol are substituted for the 25.0 parts of β-diethylaminoethanol taken, the corresponding β-di-n-butylaminoethyl-m-diethylaminomethyl benzoate is obtained as an oil. By treatment in dry ether with dry hydrogen chloride a hygroscopic solid is formed that is difficult to maintain, in friable form. It is best maintained and used in solution.

Example 3

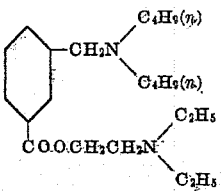

31.0 parts of sodium m-di-n-butylaminomethyl benzoate are slowly added portionwise to 25.0 parts of thionyl chloride previously chilled to 5° C. The temperature of the reaction mixture is then held for 1 hour at 5–10° C. and is slowly raised to 50° C. After 3 hours at this temperature the excess thionyl chloride is removed by distillation under reduced pressure and the residue is well washed with ether. To the residue at low temperature 30 parts of cold, dry piperidine are added and then 25.0 parts of β-diethylaminoethanol are slowly dropped in. The reaction mixture is then stirred and heated on a steam bath for 2 hours. After chilling the reaction mixture to 5–10° C., 50 parts of water are stirred in and 55 parts of 10% soda ash solution are dropped in. The crude oil is extracted with ether and dried by addition of anhydrous sodium sulfate. The ether is distilled and the β-diethylaminoethanol is removed by distillation under reduced pressure. The residue is then extracted with ether, treated with decolorizing carbon, clarified and treated with dry hydrogen chloride. The dihydrochloride is a hygroscopic solid.

The sodium-m-di-n-butyl aminomethyl benzoate used in the above preparation is prepared through the reaction of m-cyanbenzyl bromide in ether solution with an excess of di-n-butyl amine, filtration of the resulting reaction mixture, evaporation of the ether and hydrolysis with concentrated hydrochloric acid. Upon completion of reaction the solution is evaporated to dryness and the residue is freed of excess acid over silica gel. Upon solution in water and titration with sodium hydroxide the sodium salt is produced which is isolated by evaporation to dryness.

Example 4

β-Morpholino ethyl-m-di-n-butylaminomethyl benzoate

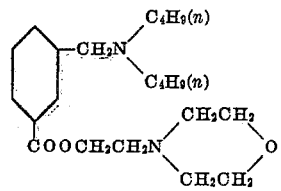

In the procedure of Example 3 the β-diethylaminoethanol is substituted by 28.0 parts of β-morpholinoethanol and the corresponding β-morpholinoethyl-m-di-n-butylaminomethyl benzoate is obtained as a hygroscopic dihydrochloride.

This application is a continuation-in-part of our copending application Serial No. 439,236, filed April 16, 1942.

We claim:

1. An amino alcohol ester of a meta-amino methylbenzoic acid having the formula:

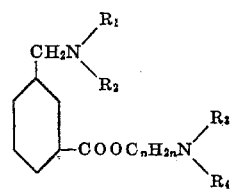

in which $R_1$ and $R_2$ and $R_3$ and $R_4$ are members of the group consisting of lower aliphatic hydrocarbon radicals and a portion of a saturated heterocyclic ring, and $n$ is an integer not greater than four.

2. An ester according to claim 1 in which the aminomethyl group is diethylaminomethyl.

3. A β-diethylaminoethyl-m-diethylaminomethyl benzoate.

4. A β-di-n-butylaminoethyl-m-diethylaminomethyl benzoate.

5. A β-diethylaminoethyl-m-di-n-butylaminomethyl benzoate.

ROBERT P. PARKER.
ARTHUR J. HILL.

REFERENCES CITED

The following references are of record in the file of this patent:

FOREIGN PATENTS

| Number | Country | Date |
|---|---|---|
| 172,447 | Germany | Nov. 16, 1905 |

OTHER REFERENCES

Gilman et al., "Jour. Pharm. Exp. Ther.," vol. 74, pp. 304–306 (1942).

Einhorn, "Annalen der Chem.," vol. 300, pp. 156, 162 (1898).

Blicke et al., Jour. Am. Chem. Soc.," vol. 65, p. 2281 (1943).